(12) United States Patent
Votolato

(10) Patent No.: US 10,117,532 B2
(45) Date of Patent: Nov. 6, 2018

(54) HOT LIQUID SAFETY PITCHER

(71) Applicant: Earl Votolato, Newport Beach, CA (US)

(72) Inventor: Earl Votolato, Newport Beach, CA (US)

(*) Notice: Subject to any disclaimer, the term of this patent is extended or adjusted under 35 U.S.C. 154(b) by 91 days.

(21) Appl. No.: 14/988,967

(22) Filed: Jan. 6, 2016

(65) Prior Publication Data

US 2017/0188728 A1   Jul. 6, 2017

(51) Int. Cl.
*A47G 19/12* (2006.01)
*A47J 47/01* (2006.01)
*A47J 47/16* (2006.01)
*A47J 27/21* (2006.01)

(52) U.S. Cl.
CPC .............. *A47G 19/12* (2013.01); *A47J 47/01* (2013.01); *A47J 47/16* (2013.01); *A47J 27/21166* (2013.01); *A47J 2203/00* (2013.01)

(58) Field of Classification Search
CPC ...... A47G 19/12; A47G 19/14; B67D 3/0051; A47J 41/0027; A47J 27/21166; A47J 27/21
USPC ........... 222/109, 465.1, 475.1; 220/681, 4.21
See application file for complete search history.

(56) References Cited

U.S. PATENT DOCUMENTS

| | | | | |
|---|---|---|---|---|
| 4,235,348 A * | 11/1980 | Watson | ............... | A47G 19/2266 206/427 |
| 4,832,231 A * | 5/1989 | Kolody | .................. | A47G 19/12 222/144.5 |
| 4,957,224 A * | 9/1990 | Kessler | .................. | A47G 19/12 222/465.1 |
| 5,243,964 A * | 9/1993 | Kos | ......... | A47G 19/12 126/390.1 |
| 5,497,917 A | 3/1996 | Krimmel et al. | | |
| 5,653,362 A | 8/1997 | Patel | | |
| 5,855,163 A * | 1/1999 | DeMars | ................. | A47G 19/12 219/448.17 |
| 5,988,457 A | 11/1999 | Andrew et al. | | |
| 6,648,183 B2 | 11/2003 | Nybakke | | |
| 6,755,120 B1 | 6/2004 | Lin | | |
| 2006/0043125 A1 * | 3/2006 | Pope | ...................... | A47G 19/14 222/475.1 |
| 2015/0072059 A1 * | 3/2015 | Zaczek | .................... | C12H 1/14 426/474 |

* cited by examiner

*Primary Examiner* — Patrick M Buechner
*Assistant Examiner* — Robert Nichols, II
(74) *Attorney, Agent, or Firm* — Robert J. Lauson, Esq.; Lauson & Tarver LLP

(57) ABSTRACT

A pitcher for safely receiving, transporting and decanting a hot liquid includes a body with first and second openings, and a bottom cover removably attached to the body. An opening baffle near the first opening reduces the hot liquid flow rate through the first opening during decanting, and a funnel near the second opening directs the hot liquid through the second opening when receiving the hot liquid. The funnel directs the hot liquid from the second opening to the first opening if the hot liquid exits the second opening during decanting. The pitcher includes an elongated handle, a fin for dividing the hot liquid during decanting, and a scalloped outer sidewall for limiting contact with a user's hand.

20 Claims, 9 Drawing Sheets

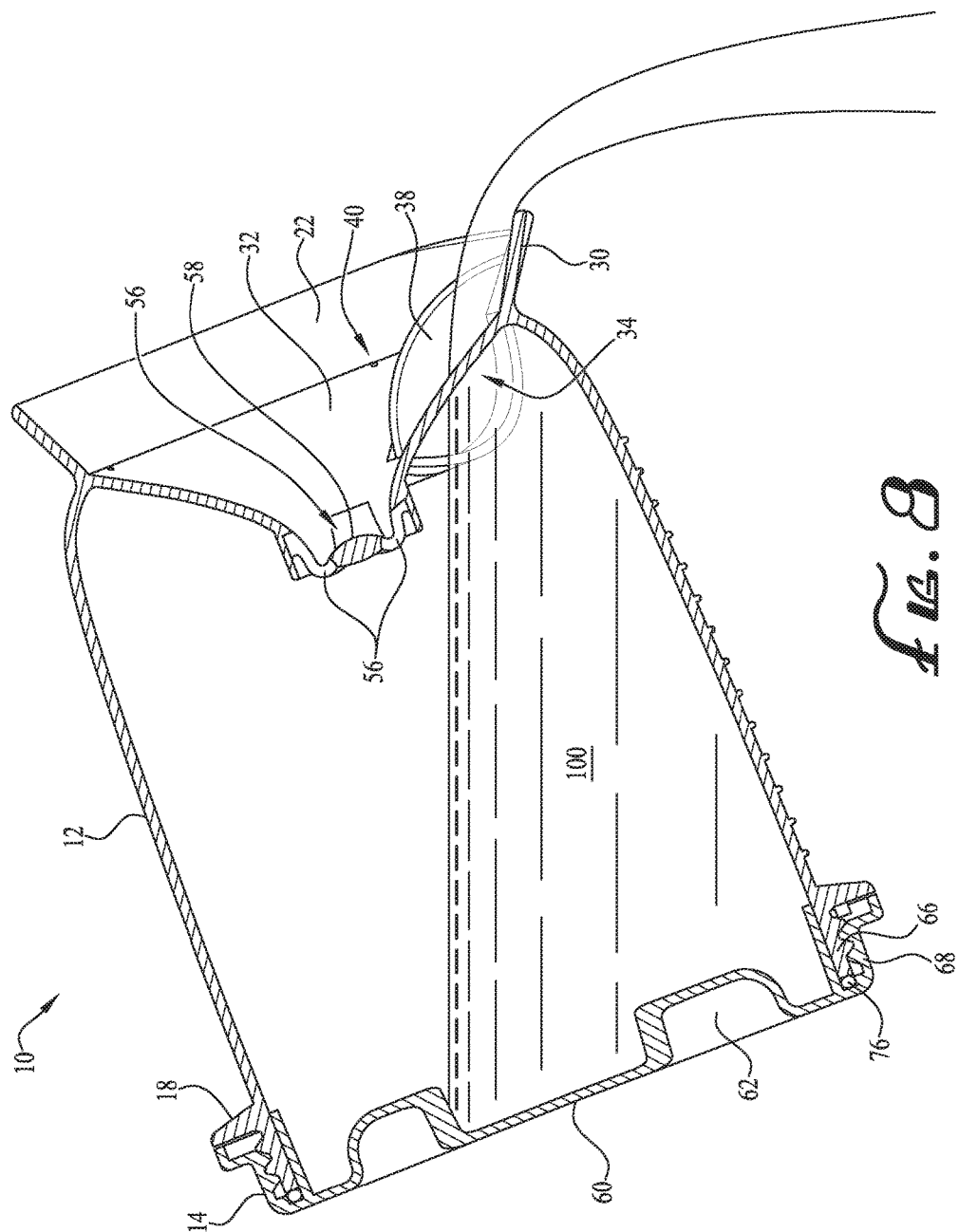

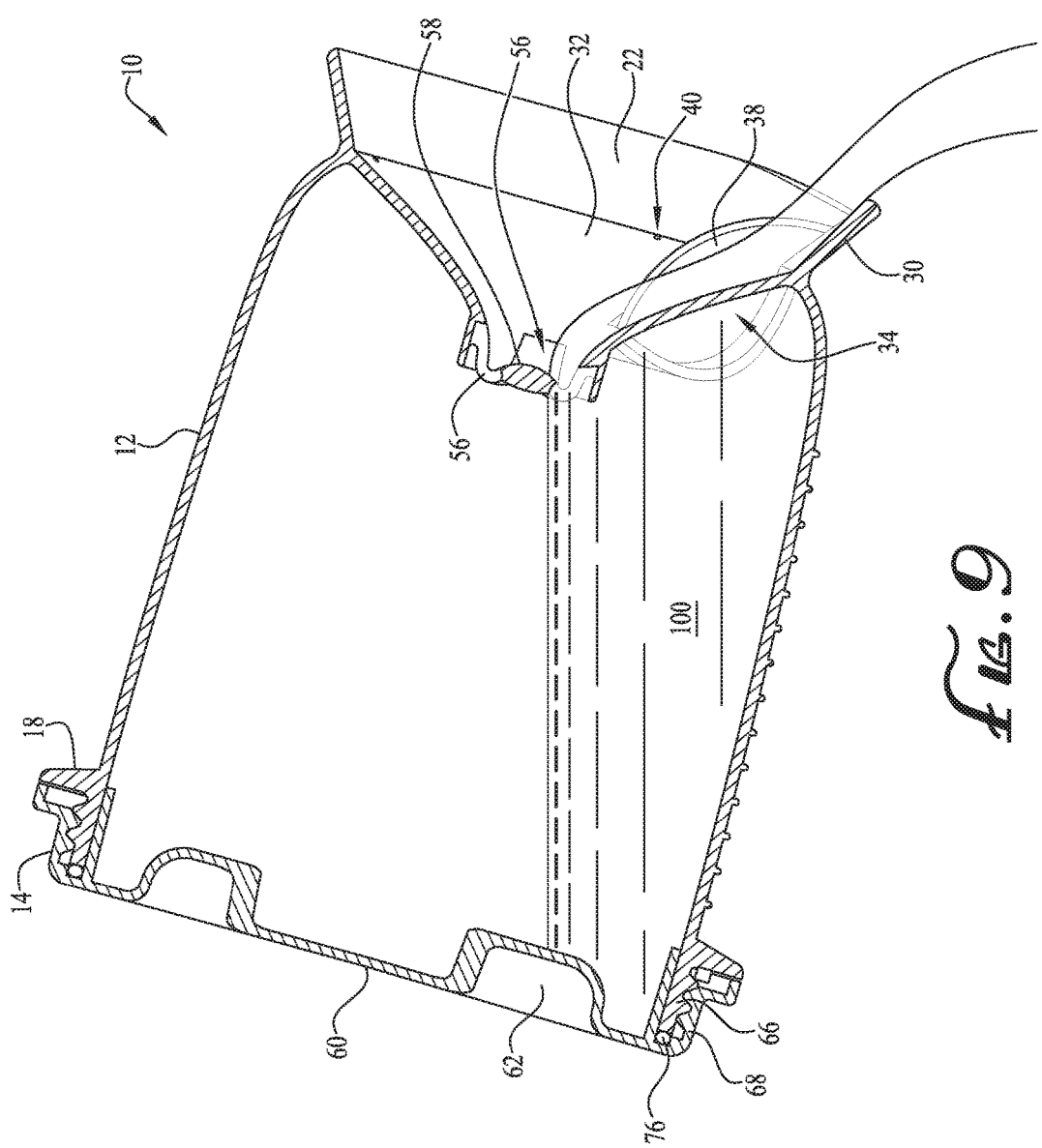

HOT LIQUID SAFETY PITCHER

BACKGROUND

Food service companies use hot liquids in food preparation and cooking processes, and often for cleaning. Thousands of injuries occur every year in commercial food service operations due to scalding from hot liquid. Scalding injuries are severe. Third degree burns occur from liquid contact above 150 degrees Fahrenheit for only two seconds. Similar burn can be caused by a six-second exposure to 140 degree liquid, or from a thirty second exposure to liquid at 130 degrees. Notably, commercial hot water dispensers in the food service industry commonly dispense water at temperatures approaching 200 degrees. Scalding injuries are primarily caused by employees spilling vessels, such as pitchers, while transporting hot liquid from a dispenser to another location.

Currently, transporting a hot liquid in a commercial setting, such as a restaurant kitchen or commissary, involves filling a vessel and walking with it to a desired location. Although covered vessels are typically indicated for such uses, open containers are frequently used. Hot liquid in an uncovered vessel is prone to slosh up and out of the vessel when agitated by an employee's walking and turning movements. If some portion of the hot liquid leaving the vessel contacts the employee's hand, face or body, the typical reaction is to release the entire vessel, which falls to the floor, ejecting the remaining hot liquid in uncontrolled directions and creating a high risk of injury to the employee and other persons in the vicinity. Burns resulting from such a spill come at great expense to the employer due to employee injury, lost work time, and worker compensation and medical claims.

Covered vessels usually have a secured lid to prevent hot liquid from sloshing out when moved. Although this lowers the likelihood of scalding from spilled hot liquid, vessel lids typically have a tenuous connection to the vessel, or are removable. If a lidded vessel is inadvertently dropped, or even tilted over in many instances, the lid may disengage, allowing hot liquid inside to splash out and cause injury. Other problems with lidded vessels is the tendency for removable lids to become lost, or many times simply thrown away by employees, thus encouraging use of the vessel without a lid. The very nature of removable lids encourages employees to not use, or discard lids, deeming them an inconvenient nuisance.

For these reasons it is an object of the present invention to provide a vessel for safely containing, transporting, and decanting hot liquids. Another object is to provide a vessel capable of safely accepting hot liquid from a dispenser and securely holding the hot liquid, preventing it from sloshing or splashing during filling, during transport when full, and during decanting. Another object is to provide a vessel with a lid incapable of dislodging, if the vessel is inadvertently dropped, or removed by a user. Another object is to provide a vessel allowing only a controlled release of hot liquid when poured or inadvertently dropped. Another object is to provide a vessel easy to disassemble, clean, and dry. Another object is to provide a locking mechanism incapable of allowing the pitcher to inadvertently disassemble. These and other objects are more fully discussed herein.

SUMMARY

A pitcher for safely receiving, transporting and decanting a hot liquid includes a body forming an internal chamber for holding the hot liquid and having a first opening and a second opening, a bottom cover attached to the body but able to he removed, an opening baffle in fluid communication with the first opening, the opening baffle near the first opening to reduce the hot liquid flow rate through the first opening during decanting of the hot liquid, and a funnel near the second opening to direct the hot liquid through the second opening during receiving the hot liquid. The funnel directs the hot liquid from the second opening to the first opening during decanting of the hot liquid.

Preferably, the bottom cover is larger in diameter than the funnel at the top of the pitcher to reduce tipping, and the pitcher includes an elongated handle extending from near the funnel to near the bottom cover for ease of the user grasping the pitcher during decanting. A fin near the first opening divides the hot liquid's flow during decanting of the hot liquid. The body includes an outer sidewall with a scalloped surface for less surface area for contacting the user's hand. The body also has a chamber baffle inside the pitcher for settling the hot liquid during transporting of the hot liquid, and a lower flange in peripheral contour with the bottom cover. The bottom cover has an inner wall extending into the body of the pitcher.

The pitcher for safely receiving, transporting and decanting a hot liquid, may also be described as having a body with a funnel and a sidewall extending downward from the funnel. The funnel includes a first opening next to the sidewall and a second opening below the first opening. The handle is preferably opposite the first opening. An opening baffle in the body next to the first opening hinders the hot liquid when decanting, and a bottom cover is attached, but removable, to the body. The pitcher is configured such that the funnel directs the hot liquid from the second opening toward the first opening when decanting.

A third characterization of the pitcher for safely receiving, transporting, and decanting a hot liquid, is the pitcher having a body with a baffle to settle the hot liquid in the body. A funnel is formed in the body, and the funnel has a first opening for dispensing the hot liquid and a second opening for receiving the hot liquid. A bottom cover is removably attached to the body, wherein the funnel directs the hot liquid from the second opening to the first opening when decanting the hot liquid. A hole in the body fully drains the hot liquid from the body when the pitcher is inverted. And the body has a flange in peripheral contour with the bottom cover, the bottom cover having an inner wall extending into the body of the pitcher.

BRIEF DESCRIPTION OF THE FIGURES

FIG. 8 illustrates a section view of the pitcher tipped to a normal angle decanting the hot liquid.

FIG. 9 illustrates a section view of the pitcher tipped to an extreme angle safely decanting the hot liquid.

DESCRIPTION

Figure 1:
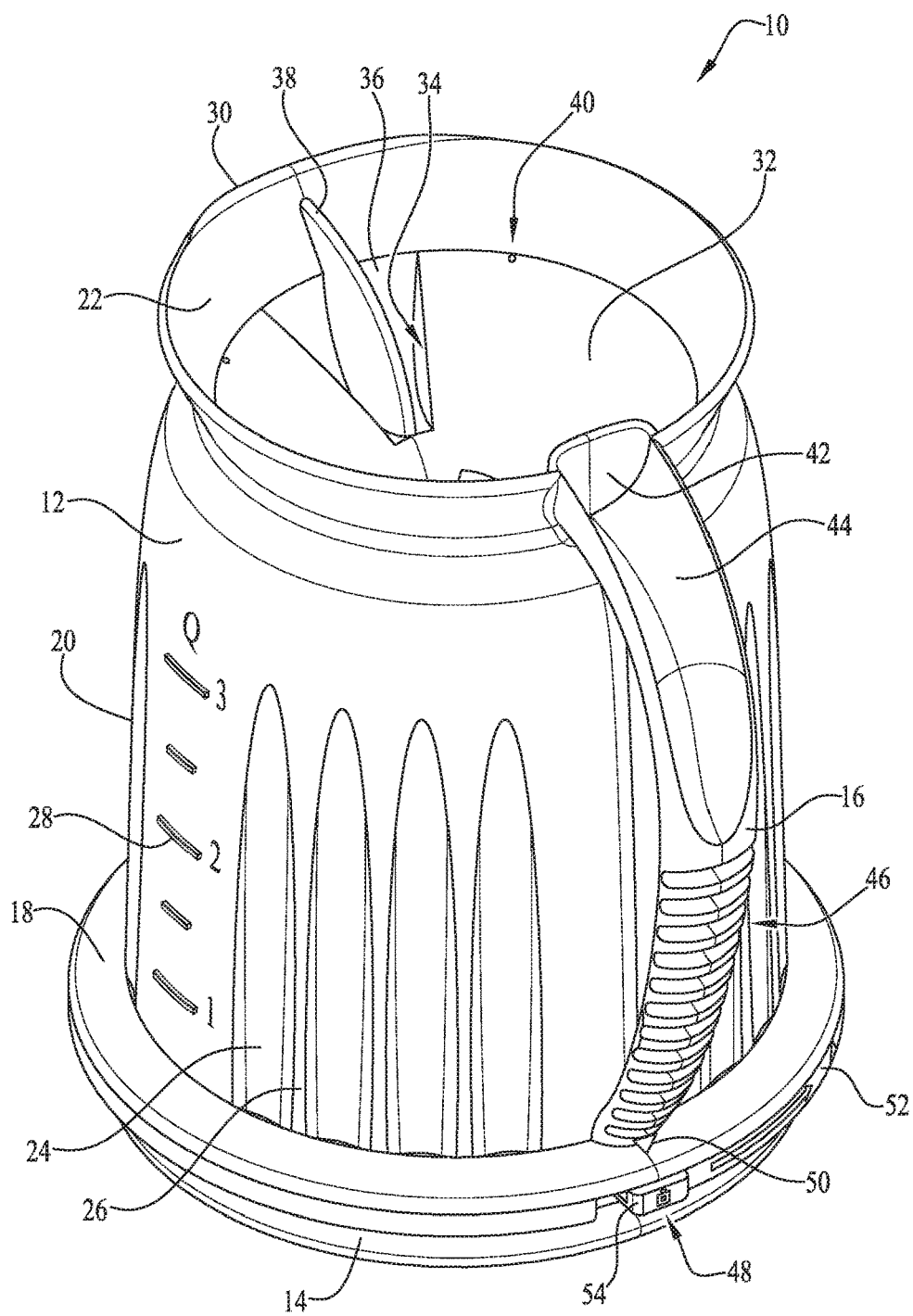
FIG. 1 illustrates a perspective view of a hot liquid safety pitcher.
Figure 2:
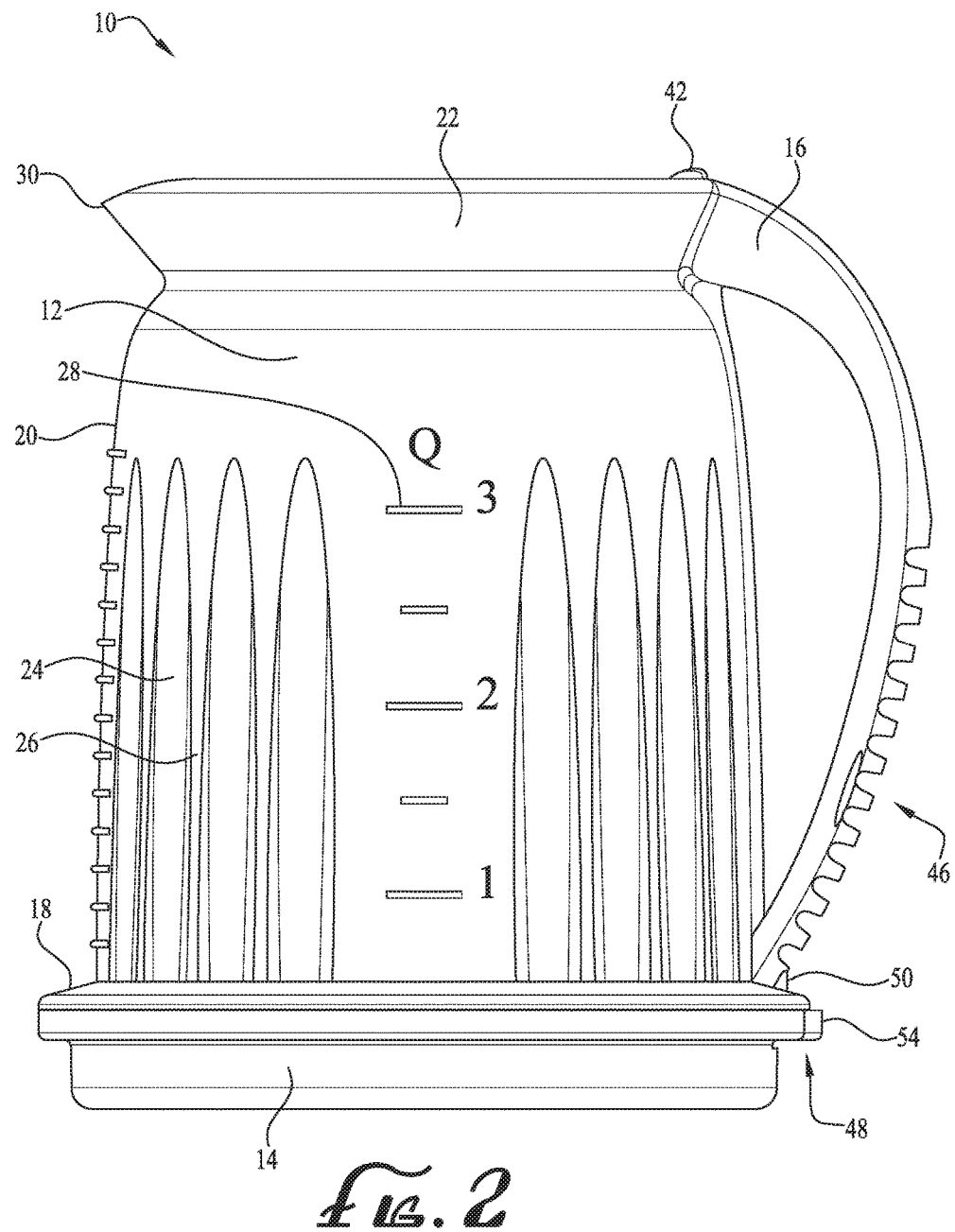
FIG. 2 illustrates a side view of the pitcher.

Referring to FIGS. 1 and 2, a pitcher 10 for transporting a scalding hot liquid 100 (FIGS. 7 and 8) includes a body 12 and a locking bottom cover 14. The body 12 is characterized by a handle 16, a flange 18, a sidewall 20, and a splash guard 22. In addition to having a smaller diameter than the flange 18, the sidewall 20 may also decrease in diameter from the flange 18 toward the splash guard 22, thereby enhancing the pitcher's 10 low center of gravity. The sidewall 20 is characterized by a circumferential series of vertically oriented scallops 24. The scallops 24, recessed in the sidewall 20, create ridges 26 to reduce surface area contact when touching the hot pitcher 10.

The sidewall 20 also includes grading 28 for accurate measuring. The pitcher 10 may be clear or partially opaque to allow viewing the hot liquid 100 level, or alternatively, only the grading 28 may be transparent, thereby showing the hot liquid 100 level. Multiple grading 28 indicia on the sidewall 20 are contemplated to allow measuring in different units, such as metric versus U.S. customary. Preferably, all components of the pitcher 10, including the body 12 and bottom cover 14, comprise food grade BPA-free and FDA approved materials.

The splash guard 22 extends upward from the sidewall 20 to prevent the hot liquid 100 from splashing out of the pitcher 10, and preferably includes a lip 30 to help prevent adhesion to the pitcher 10 during decanting. That is, the hot liquid 100 running down the sidewall 20 of the pitcher 10. The splash guard 22 surrounds a funnel 32 integrally formed as part of the body 12 which functions as a non-removable lid. Although molding the funnel 32 with the body 12 is preferred, alternative embodiments may include a separately constructed Runnel 32 affixed to the body 12, preferably requiring a special tool for removing the funnel 32 from the body 12.

The funnel 32 includes an upper surface formed with the first opening which communicates with the internal chamber through first opening passages 34 for decanting hot liquid 100. The first opening preferably includes an opening guard 36 to prevent hot liquid 100 from gushing out of the pitcher 10, and a fin 38, preferably bisecting the first opening passages 34 and opening guard 36, for added directional pouring control and to reduce splashing. The funnel 32 also incorporates small holes 40 to aid in equalizing displaced air as hot liquid 100 enters or exits the pitcher 10. The small holes 40 also allow drainage and drying after use when the pitcher 10 is inverted and resting on a flat surface.

The handle 16 is preferably shaped in a broad arc, extending from the splash guard 22 to the flange 18, to more easily control the pitcher 10, particularly when full. An elevated thumb guard 42 where the handle 16 joins the splash guard 22 extends higher than the splash guard 22 for both added protection, and to allows drainage and drying when the pitcher 10 is inverted on a flat surface (not shown) by allowing air flow under the splash guard 22.

At the top of the handle 16 adjacent the thumb guard 42 is a groove 44 to accommodate a user's finger or thumb (not shown). The groove 44 is enlarged and lengthened to accommodate a variety of sizes. Below the groove 44, the handle 16 includes a channeled section 46. The groove 44 and channeled section 46 provide dual purposes of providing for effective gripping while also reducing the quantity of material needed to construct the pitcher 10.

The bottom cover 14 is positioned just below the flange 18 when installed on the pitcher 10. The bottom cover 14 is preferably at least the same diameter as the flange 18 and includes a locking mechanism 48, discussed in more detail below, for preventing the bottom cover 14 from inadvertently disengaging from the pitcher 10. To assist affixing the bottom cover 14 to the pitcher 10, an upper indicator 50 and a lower indicator 52 are used. The upper indicator 50 is preferably disposed on the flange 18, adjacent the handle 16, and the lower indicator 52 is disposed on the bottom cover 14. A release 54 allows the locking mechanism 48 to be unlocked.

Figure 3:
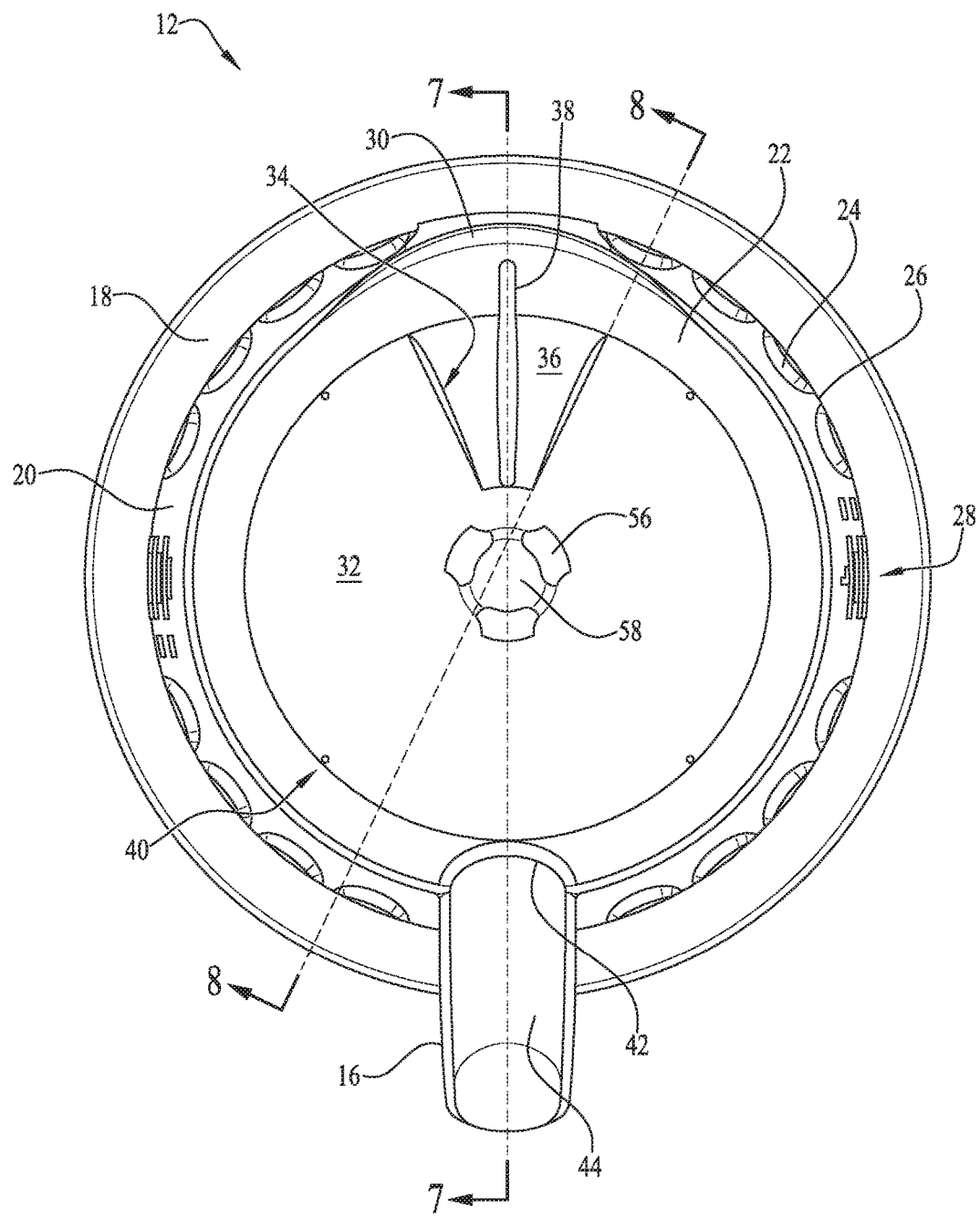
FIG. 3 illustrates a top plan view of the pitcher.

Referring to FIG. 3, the funnel 32 extends to the splash guard 22 and thumb guard 42. The opening guard 36 and fin 38 are also preferably incorporated into the funnel 32 opposite the handle 16. Also shown in this view, the flange 18 extends beyond the scallops 24 and ridges 26 of the sidewall 20. The funnel 32 also includes one or more second openings 56 and a domed section 58. The second openings 56 accept hot liquid 100 (FIGS. 7 and 8) poured into the funnel 32, and the domed section 58 helps direct hot liquid 100 from the funnel 32 toward the second. openings 56 to prevent splashing. Providing multiple second openings 56 also facilitates venting of displaced air as hot liquid 100 enters the pitcher 10.

Figure 4:
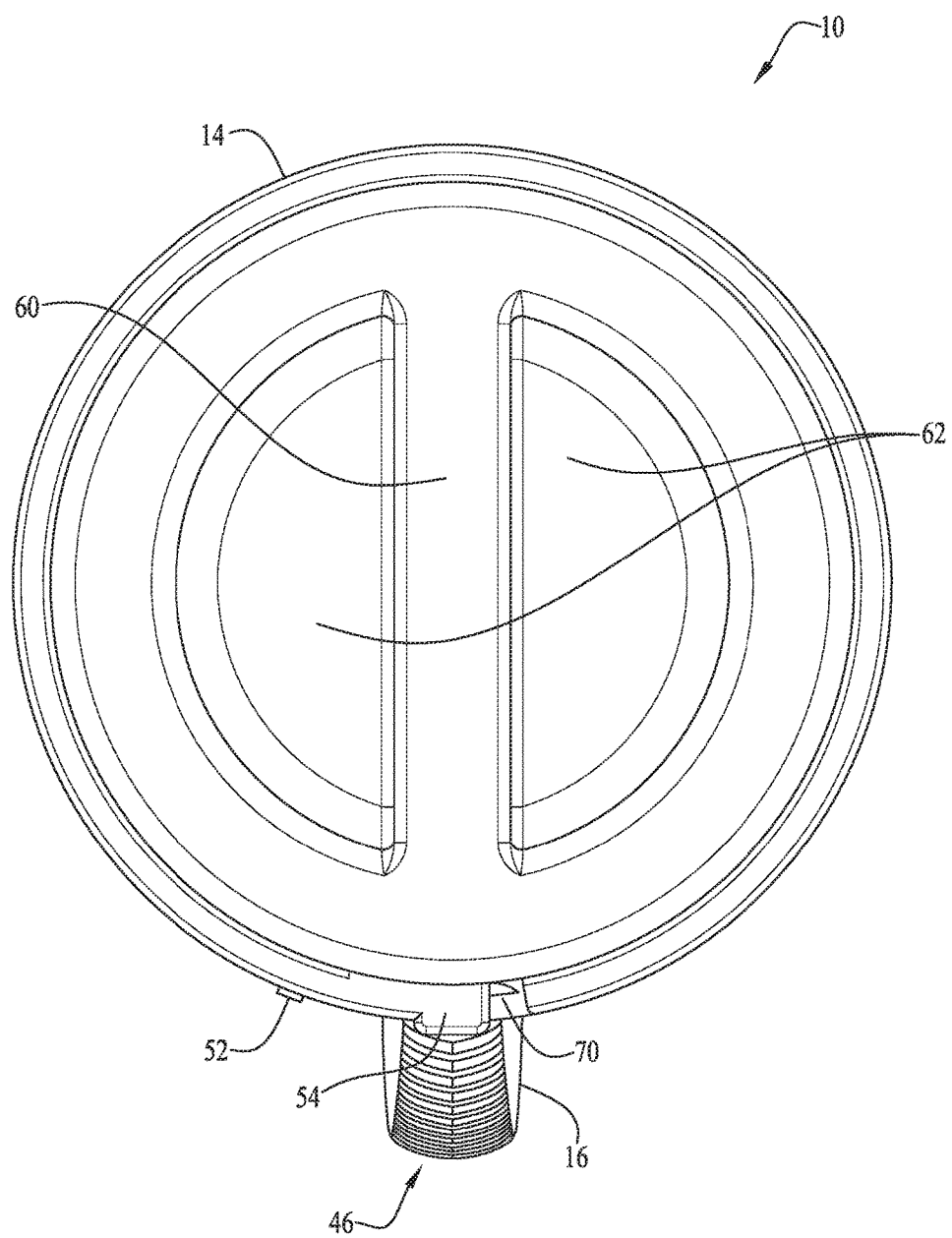
FIG. 4 illustrates a bottom view of the pitcher.

Referring to FIG. 4, the bottom cover 14 preferably includes a rotating grip 60 to facilitate grasping and rotating the bottom cover 14 relative to the body 12. Aligning the upper indicator 50 (FIGS. 1 and 2) with the lower indicator 52 and turning the bottom cover 14 with the rotating grip 60 to align the release 54 with the upper indicator 50 locks the bottom cover 14 onto the body 12. Depressing the release 54 allows the bottom cover 14 to rotate in the opposite direction and eventually disengage from the body 12. In the illustrated embodiment the rotating grip 60 is a single cross piece bisecting two semi-circular indentations 62, although any configuration effective for turning the bottom cover 14 is contemplated.

Figure 5:
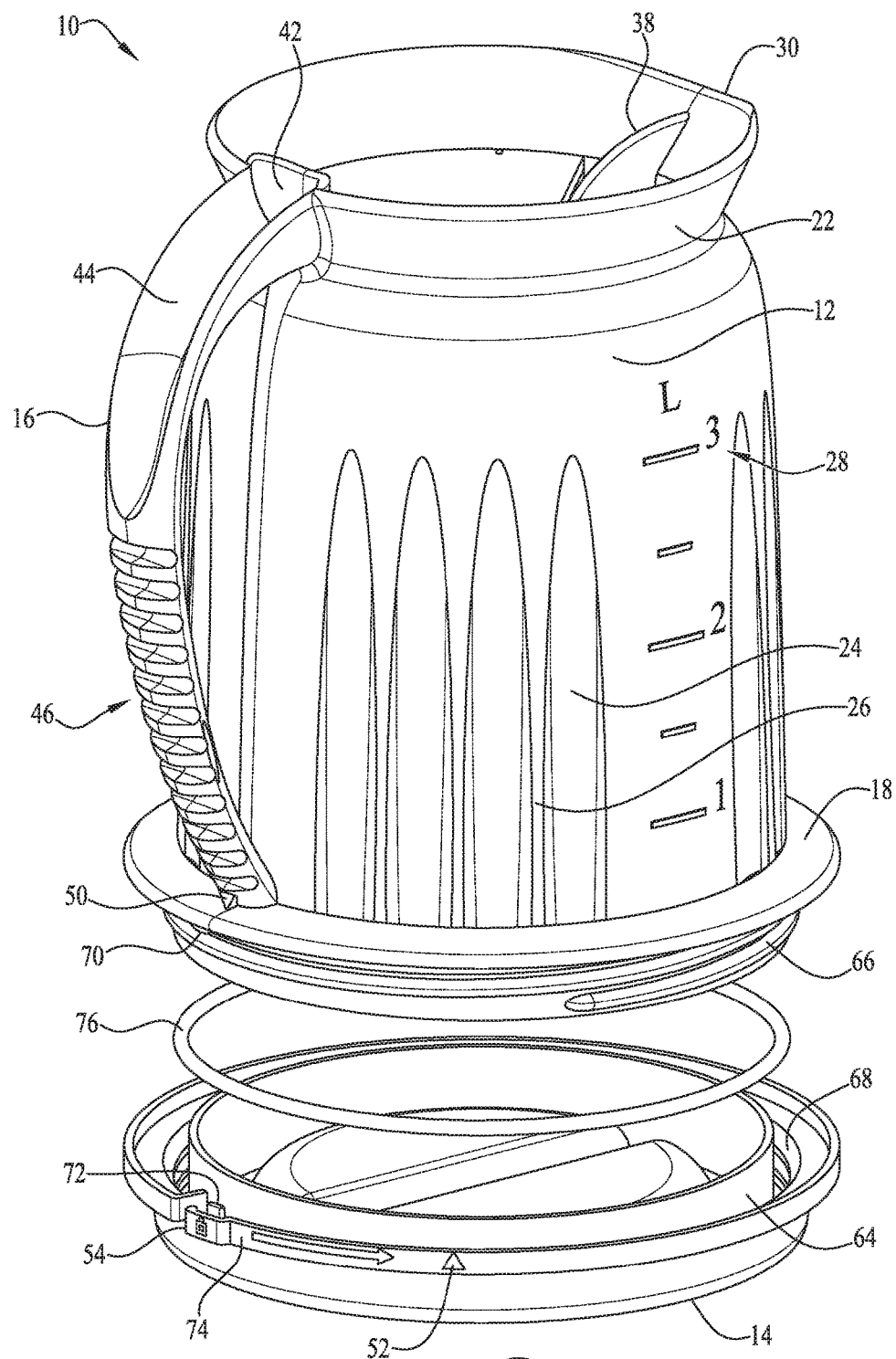
FIG. 5 illustrates a perspective view of the pitcher with a bottom cover removed.

Referring to FIG. 5, the pitcher 10 is shown with the bottom cover 14 separated from the body 12. To assemble the pitcher 10, the bottom cover 14 is aligned with the body 12 and rotated against it. To ensure fast and easy alignment, an inner wall 64 is provided on the bottom cover 14, sized to fit just inside the body 12. A first thread 66 on the body 12 aligns with a second thread 68 surrounding the inner wall 64. When the inner wall 64 is inserted into the body 12 and the bottom cover 14 rotated, the first thread 66 engages the second thread 68, bringing the bottom cover 14 up against the flange 18, and in a corresponding movement, drive the inner wall 64 further into the body 12.

As the first and second threads 66, 68 rotate against each other, driving the bottom cover 14 onto the body 12, the release 54 eventually encounters a wedge member 70 projecting from the flange 18. The wedge member 70 passes between the release 54, and a release tab 72, thereby impinging on the release tab 72 to deflect a resiliently deformable arm 74 holding the release 54 and release tab 72.

When the bottom cover 14 reaches a fully engaged position, the release tab 72 clears the wedge member 70, allowing the resiliently deformable arm 74 to return the release tab 72 to an obstructed position behind the wedge member 70 with an audible "click." At the same time, the upper indicator 50 and lower indicator 52 come into alignment, providing visual confirmation that the bottom cover 14 is locked onto the body 12. In the locked position, a gasket 76 (FIGS. 7 and 8), for example an o-ring as shown in the illustrated embodiment, is pressed between the body 12 and the bottom cover 14, rendering the pitcher 10 leak proof.

To uninstall the bottom cover 14, the release 54 is depressed, bending the deformable arm 74 and causing the release tab 72 to clear the wedge member 70, thereby allowing the bottom cover 14 to rotate in the opposite direction. When the first thread 66 clears the second thread 68, the bottom cover 14 may be pulled away from the body 12.

Figure 6:
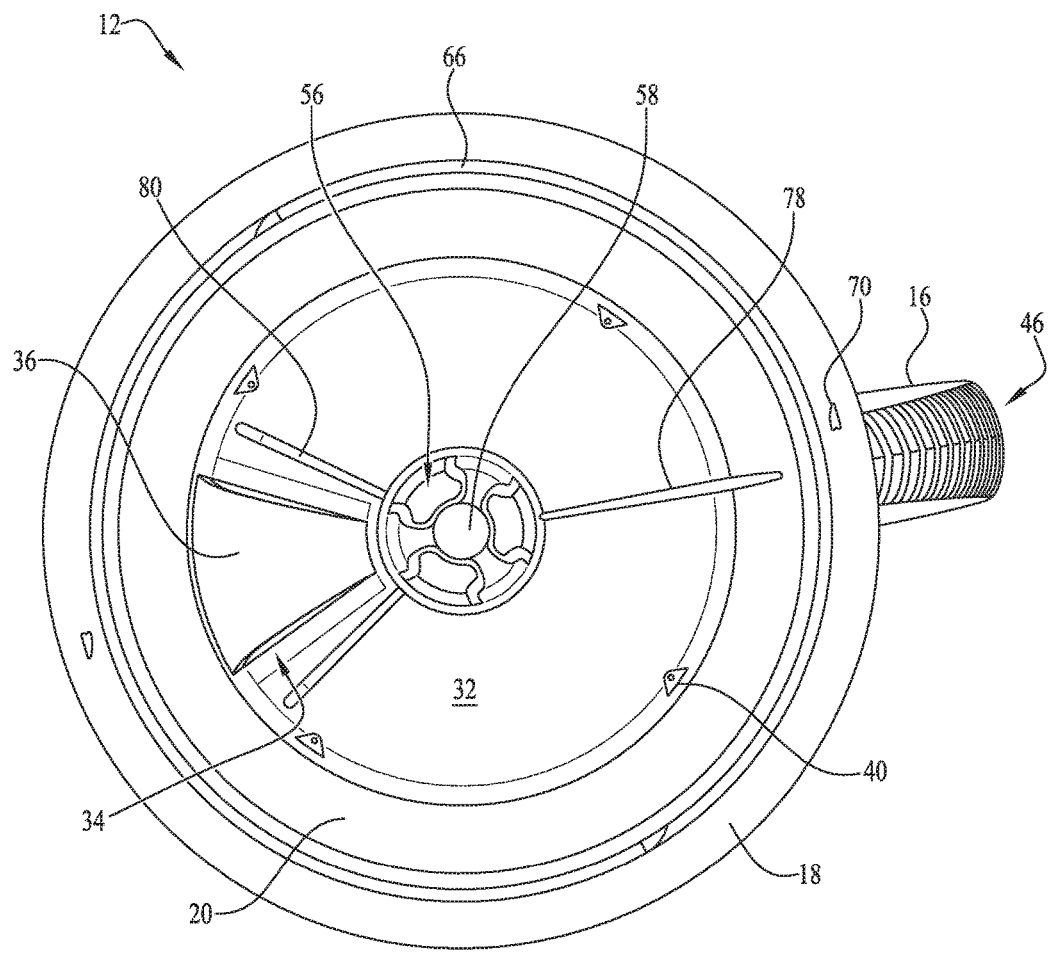
FIG. 6 illustrates a bottom view of the pitcher with the bottom cover removed.

Referring FIG. 6, the body 12 is shown with the bottom cover 14 (not shown) removed. In this view the first thread 66 and wedge member 70 of the flange 18 are shown, along with additional structures of the body 12 interior, including the sloping nature of the sidewall 20, a chamber baffle 78 and two opening baffles 80 that reduce turbulence under the funnel 32. The chamber baffle 78 extends downward from the funnel 32 to help settle agitated hot liquid 100 (FIGS. 7 and 8) in the body 12. The opening baffles 80 serve that purpose as well, but also prevent hot liquid 100 from pouring freely through the first opening passages 34.

Figure 7:
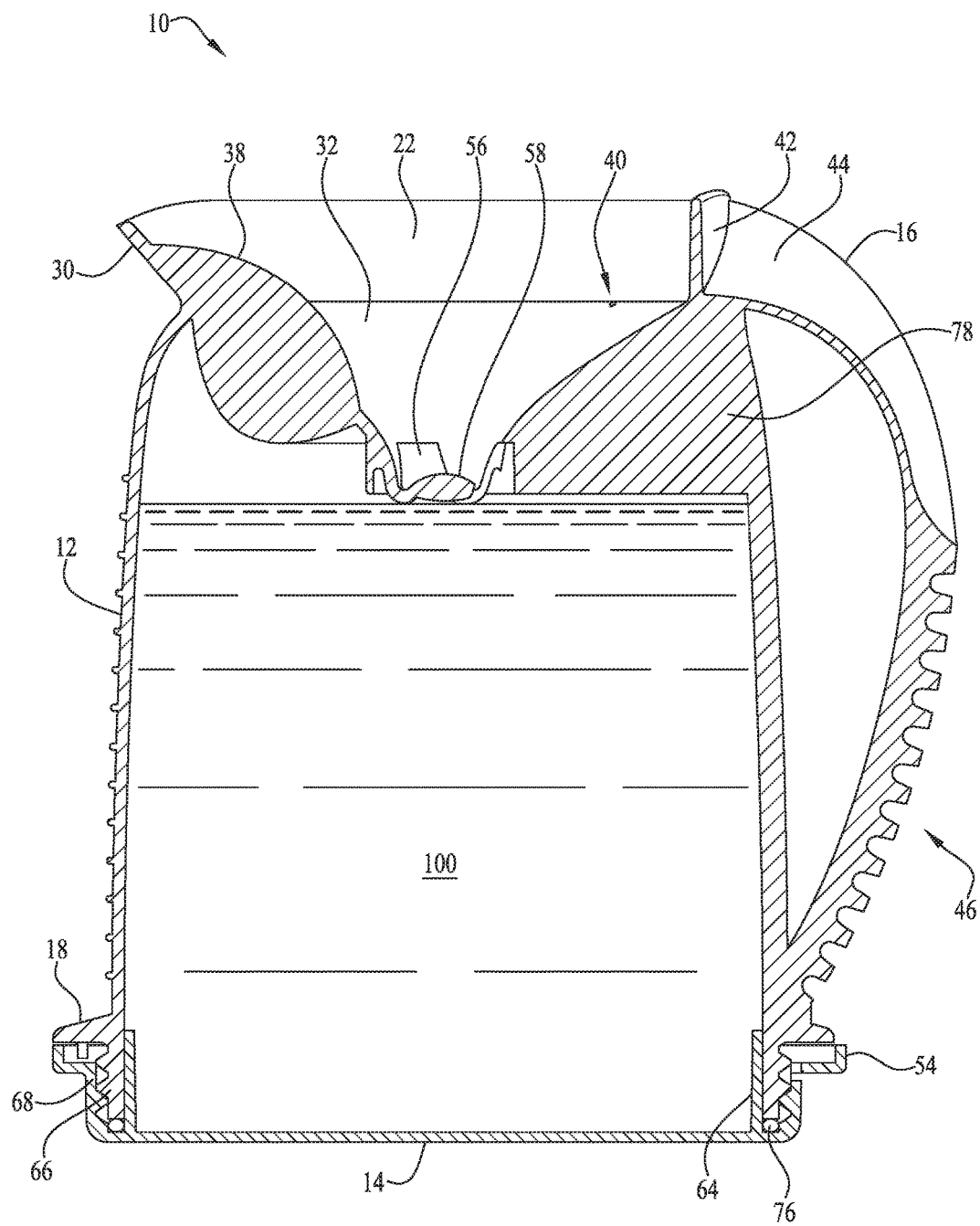
FIG. 7 illustrates a section view of the pitcher filled with hot liquid.

Referring to FIG. 7, a bilateral section view of the pitcher 10 shows the bottom cover 14 installed on the body 12, the first and second threads 66, 68, the release 54 and release tab 72 in a locked position, and the gasket 76 preventing the hot liquid 100 (FIGS. 7 and 8) from escaping. Also shown is the chamber baffle 78, which settles the hot liquid 100 and the fin 38, which directs and guides the hot liquid 100 as it leaves the pitcher 10.

Referring to FIG. 8, a non-bilateral section view of the pitcher 10 is shown, tipped to a normal angle for decanting the hot liquid 100. The pitcher 10 is tipped sufficiently to cause the hot liquid 100 to flow through the first opening passages 34. Hot liquid 100 flowing toward the first opening passages 34 encounters the opening baffles 80 (FIG. 6). As the hot liquid 100 flows against and around the opening baffles 80, changes in flow direction increase turbulence in the hot liquid 100, slowing it down. After travelling around the opening baffles 80, the hot liquid 100 passes through the first opening passages 34 and encounters the fin 38, which introduces more turbulence, slowing the hot liquid 100 down further. The position of the fin 38 causes hot water 100 glancing off the fin 38 to leave the pitcher 10 at the lip 30. Hot liquid 100 in the pitcher 10 may be decanted in this mariner until the pitcher 10 is empty.

Referring to FIG. 9, a non-bilateral section view of the pitcher 10 is shown, tipped to an extreme angle when decanting the hot liquid 100. Occasionally, the pitcher 10 may be inadvertently tipped too far over during decanting, such that the hot liquid 100 reaches the level of the second openings 56. When this happens, the hot liquid 100 exits the second openings 56 in addition to exiting the first opening passages 34 and first opening in the manner shown in FIG. 8. When the hot liquid 100 reaches the second openings 56 and passes through them, the funnel 32 directs the hot liquid 100 toward the fin 38, where it joins the hot liquid 100 exiting the first opening and leaves the pitcher 10 at the lip 30.

While there are no structures immediately adjacent the second openings 56 to slow down the hot liquid 100, the second openings 56 are sized so that only a small volume of the hot liquid 100 can exit through the second openings 56. Some additional turbulence is introduced in embodiments having numerous second openings 56 as shown due to the hot liquid 100 encountering and traveling around the domed section 58. With the funnel 32 holding back most of the hot liquid 100 (except the hot liquid 100 exiting the first opening passages 34 and second openings 56) when the pitcher 10 is tipped severely, a person operating the pitcher 10 has time to notice or to be alerted to the incorrect pour angle and correct it before the hot liquid 100 can spill and cause injury.

Once all of the hot liquid 100 is decanted, the pitcher 10 can be taken away for cleaning, or refilled. To refill the pitcher 10, the hot liquid 100 is introduced into the funnel 32, where it travels over the domed section 58 and through the second openings 56 until the pitcher 10 is full. As is the case with decanting, when filling the pitcher 10, the first opening passages 34 and second openings 56 work together for safety. Namely, if the hot liquid 100 is introduced into the funnel 32 at too great a rate so that it builds up behind the second openings 56, the first opening passages 34 provide a relief point of entry, thereby preventing the hot liquid 100 from rising up and over the splash guard 22 and causing injury.

The structure of the pitcher 10 having been shown and described, its method of use will now be discussed.

When retrieving, transporting, and decanting hot liquid 100, a user Obtains an empty pitcher 10. If the bottom cover 14 is separated due to prior use, cleaning or storage, the user brings the body 12 against the bottom cover 14 and inserts the inner wall 64 into the body 12. The user then rotates the bottom cover 14, causing the first and second threads 66, 68 to bring the upper indicator 50 and the lower indicator 52 into alignment, whereupon the release tab 72 "clicks" behind the wedge member 70, urged into position by the deformable arm 74, and locking the bottom cover 14 against the body 12 with the body 12 held tightly against the gasket 76 to prevent leakage.

The pitcher 10 may then be filled with hot liquid 100, which is introduced into the funnel 32. Splashing hot liquid 100 entering the funnel 32 is retained by the splash guard 22, and travels downward where it encounters the domed section 58 which directs it through the second openings 56 and into the pitcher 10. If the hot liquid 100 builds up behind the second openings 56, it will reach the first opening passages 34 and enter the pitcher 10 that way. If the hot liquid 100 is introduced at a flow rate exceeding what the second openings 56 and first opening passages 34 can accommodate, the splash guard 22 above the funnel 32 confines the hot liquid 100, giving a user time to adjust the hot liquid 100 flow rate.

As the hot liquid 100 fills the pitcher 10, the user may also observe grading 28 on the sidewall 20 to accurately measure a particular desired volume of hot liquid 100. Once the pitcher 10 is full or a predetermined volume of the hot liquid 100 received therein, the hot liquid 100 supply (not shown) is turned off. The pitcher 10 may then be transported to a desired location for decanting the hot liquid 100. After the hot liquid 100 is decanted, the pitcher 10 may be refilled or cleaned for storage.

When a user needs to clean and dry the pitcher 10, or remove the bottom cover 14 for any reason, the release 54 is depressed, the bottom cover 14 rotated in a releasing direction until the first thread 66 clears the second thread 68, allowing the bottom cover 14 to disengage from the body 12. With the bottom cover 14 removed, the user can access all surfaces of the body 12 and the bottom cover 14. To dry the pitcher, the bottom cover 14 is preferably kept separate from the body 12 and the body inverted over a drying rack (not shown) or similar drying structure. Any remaining moisture (not shown) will drain through the small holes 40 where the funnel 32 meets the splash guard 22, which is the lowest point of the body 12 when inverted, thereby allowing the body to dry completely and avoid moisture-related contamination such as mold buildup.

The foregoing description of the preferred embodiment of the Invention is sufficient in detail to enable one skilled in the art to make and use the invention. It is understood, however, that the detail of the preferred embodiment presented is not intended to limit the scope of the invention, in as much as equivalents thereof and other modifications which come within the scope of the invention as defined by the claims will become apparent to those skilled in the art upon reading this specification.

What is claimed is:

1. A pitcher for safely receiving, transporting and decanting a hot liquid, the pitcher comprising:
   a body forming an internal chamber for holding the hot liquid and having a funnel defining an upper surface formed with a first opening and a second opening, the body having an opening guard and a fin extending from the opening guard, the opening guard being disposed to intermediately traverse and partially obstruct the first opening, to define thereabout a plurality of first opening passages, the first opening communicating with the internal chamber through the plurality of first opening passages;
   a bottom cover removably attached to the body;
   an opening baffle formed in the body, the opening baffle in fluid communication with the first opening the opening baffle proximate the first opening to reduce the hot liquid flow rate through the first opening during decanting of the hot liquid; and
   the funnel configured proximate the second opening to direct the hot liquid through the second opening during receiving the hot liquid;
   wherein the funnel is configured to direct the hot liquid from the second opening to the first opening during decanting of the hot liquid.

2. The pitcher of claim 1 wherein the bottom cover is larger in diameter than the funnel.

3. The pitcher of claim 1 further comprising an elongated handle extending from proximate the funnel to proximate the bottom cover.

4. The pitcher of claim 1, wherein the fin extends across the opening guard for dividing the hot liquid during decanting of the hot liquid.

5. The pitcher of claim 1 wherein the body has an outer sidewall with a scalloped surface for limiting contact with a user's hand.

6. The pitcher of claim 1 wherein the body has a chamber baffle for settling the hot liquid during transporting the hot liquid.

7. The pitcher of claim 1 wherein the body has a lower flange in peripheral contour with the bottom cover.

8. The pitcher of claim 1 wherein the bottom cover has an inner wall extending into the body of the pitcher.

9. A pitcher for safely receiving, transporting and decanting a hot liquid, the pitcher comprising:
   a body forming an internal chamber for holding the hot liquid and having a funnel and a sidewall extending downward from the funnel;
   the funnel defining an upper surface formed with a first opening adjacent the sidewall and a second opening below the first opening;
   the body having an opening guard and a fin extending from the opening guard, the opening guard being disposed to intermediately traverse and partially obstruct the first opening, to define thereabout a plurality of first opening passages, the first opening communicating with the internal chamber through the plurality of first opening passages, the body having a handle opposite the first opening;
   an opening baffle formed as part of the body adjacent the first opening to hinder the hot liquid when decanting; and
   a bottom cover removably attached to the body, wherein the funnel is configured to direct the hot liquid from the second opening toward the first opening when decanting.

10. The pitcher of claim 9 wherein the bottom cover is larger in diameter than the funnel.

11. The pitcher of claim 9, wherein the fin extends across the opening guard to bisect the first opening for dividing the hot liquid when decanting.

12. The pitcher of claim 9 wherein the body includes an outer scalloped surface for limiting contact with a user's hand.

13. The pitcher of claim 9 further comprising a chamber baffle under the funnel for settling the hot liquid when transporting the pitcher.

14. The pitcher of claim 9 wherein the body has a lower flange in peripheral contour with the bottom cover.

15. The pitcher of claim 9 wherein the bottom cover includes an inner wall extending into the body of the pitcher.

16. A pitcher for safely receiving, transporting, and decanting a hot liquid, the pitcher comprising:
   a body forming an internal chamber for holding the hot liquid and having a baffle to settle the hot liquid in the body;
   a funnel formed in the body, the funnel defining an upper surface formed with a first opening for dispensing the hot liquid and a second opening for receiving the hot liquid, the body having an opening guard and a fin extending from the opening guard, the opening guard being disposed to intermediately traverse and partially obstruct the first opening, to define thereabout a plurality of first opening passages, the first opening communicating with the internal chamber through the plurality of first opening passages; and
   a bottom cover removably attached to the body;
   wherein the funnel is configured to direct the hot liquid from the second opening to the first opening when decanting the hot liquid.

17. The pitcher of claim 16 further comprising an elongated handle extending from proximate the funnel to proximate the bottom cover.

18. The pitcher of claim 16, wherein the fin extends across the opening guard, the fin thereby extending across the first opening for dividing the hot liquid circumventing the opening guard when decanting the hot liquid.

19. The pitcher of claim 16 further comprising a hole in the body to fully drain the hot liquid from the body.

20. The pitcher of claim 16 wherein the body has a flange in peripheral contour with the bottom cover, and the bottom cover has an inner wall extending into the body of the pitcher.

* * * * *